(No Model.)
W. J. HESSER.
WIRE FLOWER POT HOLDER.
No. 313,667. Patented Mar. 10, 1885.
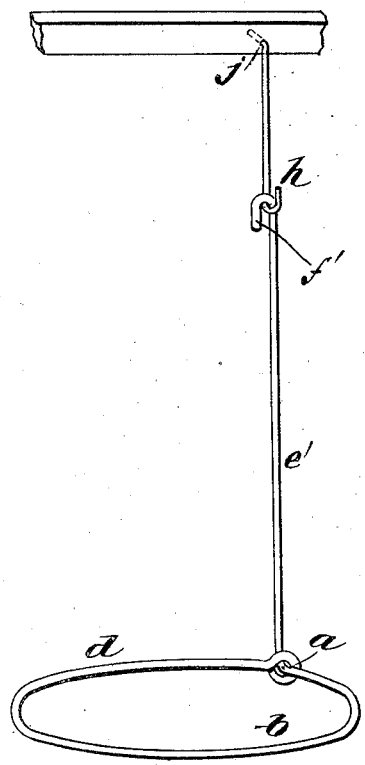
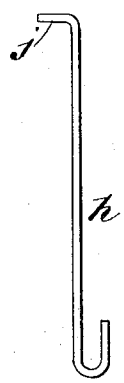
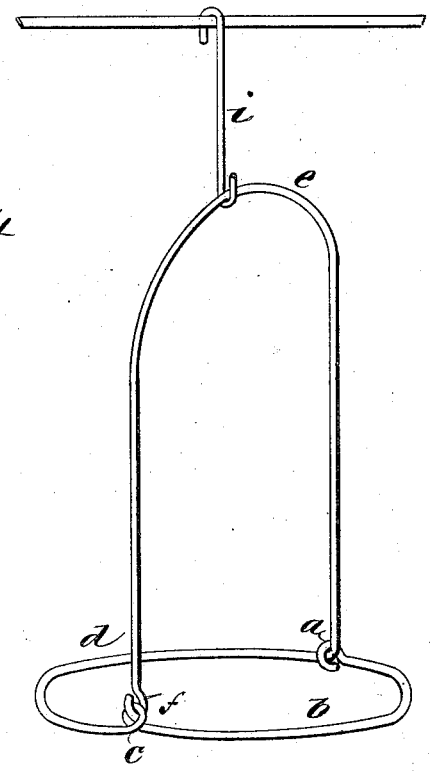
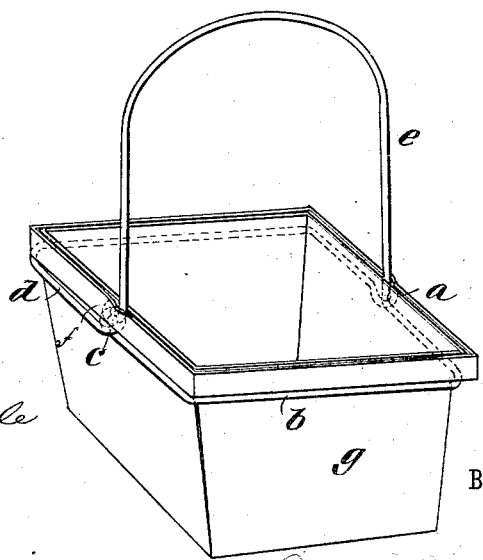
WITNESSES:
F. McArdle
C. Sedgwick
INVENTOR:
W. J. Hesser
BY Munn & Co
ATTORNEYS.

UNITED STATES PATENT OFFICE.

WILLIAM J. HESSER, OF PLATTSMOUTH, NEBRASKA.

WIRE FLOWER-POT HOLDER.

SPECIFICATION forming part of Letters Patent No. 313,667, dated March 10, 1885.

Application filed April 1, 1884. (No model.)

*To all whom it may concern:*

Be it known that I, WILLIAM J. HESSER, of Plattsmouth, in the county of Cass and State of Nebraska, have invented a new and Improved Wire Flower-Pot Holder, of which the following is a full, clear, and exact description.

My invention consists of a holder for suspending pots containing plants and flowers; also for suspending pans or other articles, and for forming handles by which to carry such articles, the object being to provide a simple and efficient device by which plants may be suspended in the windows of conservatories or houses and the like, where more light may be had, and so that more plants can be contained in a given space for economizing room, the said holder being made very simply and of a single piece of wire, as hereinafter fully described, and pointed out in the claim.

Reference is to be had to the accompanying drawings, forming part of this specification, in which similar letters of reference indicate corresponding parts in all the figures.

Figure 1 is a perspective view of my improved wire holder for pots and the like articles, as I prefer to make it. Fig. 2 is a perspective view of a modified form of the holder. Fig. 3 is a perspective view of the holder, adapted for a handle to a basket or other article of similar form; and Fig. 4 is a perspective view of a hook that may be used for suspending it.

I take a piece of wire of suitable size and length and form an eye, $a$, in one end, leaving said eye open sufficiently to hook on the wire. I then make a half-circular bend, $b$, in the wire of the required size, corresponding to the size of the pot to be suspended, and make a complete eye, $c$, in the wire, from which I make another half-circular bend, $d$, returning to the first eye, $a$, in which I hook the wire, first bending it up at right angles to the ring thus formed, and, from the eye $a$, I extend the wire upward and form a bail or yoke, $e$, of the desired size, with the other end of the wire having an eye, $f$, formed in it, returning to the eye $c$ and hooking into it. Eyes $a$ and $f$ are then closed sufficiently to fasten the wires so they will not disconnect, thus making a simple and efficient holder in which pots of any form having a rim at the top may be readily placed for being suspended.

Instead of the circular ring for pots of round form, the ring may be made rectangular for pans or baskets of the form of $g$, Fig. 3, or any other approved form.

In some cases I propose to use a single vertical extension, $e'$, of the ring, instead of the yoke $e$ for a hanger, forming a hook, $f'$, in the upper end by which to hook the holder upon a nail or a hook, $h$, or $i$, or any other suitable device. In this case the eye $c$ will not be made. The hook $h$ is constructed with a point, $j$, by which to connect the hook to the side of a post, board, or other object at any place by driving the point into the wood.

I propose to employ skeleton wire stands with cross-bars, brackets, and other devices from which to suspend these holders containing pots having flowers and plants, making a simple, useful, and ornamental contrivance for the purpose, which will afford the most room for the pots, and will give the least obstruction to the light.

It will be seen that the hoop or ring $b\ d$ will be held rigidly and better by the integral connection of the bail or hanger with said ring at $a$ than if made separately and hooked into the eyes $a\ c$ of the ring, and it enables the single hanger $i$ to be used alone, which could not be done if jointed to the ring, which is an important advantage of the contrivance aside from the cheaper construction.

Having thus described my invention, I claim as new and desire to secure by Letters Patent—

A flower-pot holder consisting of the ring $b\ d$, provided with the eyes $a\ c$ at opposite sides, and the yoke $e$, having eye $f$, the whole formed from a single piece of wire, substantially as herein shown and described.

WILLIAM J. HESSER.

Witnesses:
DANIEL H. WHEELER,
LLOYD D. BENNETT.